United States Patent
Zhou et al.

(10) Patent No.: US 11,115,110 B2
(45) Date of Patent: Sep. 7, 2021

(54) DEFAULT BEAM SELECTION BASED ON A SUBSET OF CORESETS

(71) Applicant: QUALCOMM Incorporated, San Diego, CA (US)

(72) Inventors: Yan Zhou, San Diego, CA (US); Tao Luo, San Diego, CA (US); Wooseok Nam, San Diego, CA (US); Makesh Pravin John Wilson, San Diego, CA (US); Srinivas Yerramalli, San Diego, CA (US); Xiaoxia Zhang, San Diego, CA (US); Jing Sun, San Diego, CA (US); Arumugam Chendamarai Kannan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/662,766

(22) Filed: Oct. 24, 2019

(65) Prior Publication Data
US 2020/0195334 A1    Jun. 18, 2020

Related U.S. Application Data

(60) Provisional application No. 62/780,175, filed on Dec. 14, 2018.

(51) Int. Cl.
*H04B 7/08* (2006.01)
*H04W 74/08* (2009.01)
(Continued)

(52) U.S. Cl.
CPC ............ *H04B 7/088* (2013.01); *H04L 5/005* (2013.01); *H04W 72/046* (2013.01); *H04W 72/1205* (2013.01); *H04W 74/0816* (2013.01)

(58) Field of Classification Search
CPC . H04B 7/088; H04B 7/0695; H04W 74/0816; H04W 72/046; H04W 72/1205;
(Continued)

(56) References Cited

U.S. PATENT DOCUMENTS

| | | | |
|---|---|---|---|
| 2017/0290048 A1* | 10/2017 | Amuru | H04W 74/0808 |
| 2017/0366311 A1* | 12/2017 | Iyer | H04L 5/0007 |
| 2018/0279135 A1* | 9/2018 | Hwang | H04L 5/0094 |
| 2018/0343653 A1* | 11/2018 | Guo | H04L 5/0053 |
| 2018/0368142 A1* | 12/2018 | Liou | H04W 16/14 |

(Continued)

OTHER PUBLICATIONS

Ericsson: "Feature Lead Summary 4 on Beam Measurement and Reporting", 3GPP TSG RAN WG1 Meeting #92, 3GPP Draft; R1-1803481 Feature Lead Summary 4 on Beam Management, 3rd Generation Partnership Project (3GPP), Mobile Competence Centre; vol. RAN WG1, No. Athens, Greece; Feb. 26, 2018-Mar. 2, 2018, Mar. 5, 2018 (Mar. 5, 2018), 25 Pages, XP051398779, Retrieved from the Internet: URL: http://www.3gpp.org/ftp/tsg%5Fran/WG1%5FRL1/TSGR1%5F92/Docs/ [retrieved on Mar. 5, 2018] Section 3-4.

(Continued)

*Primary Examiner* — Ivan O Latorre
(74) *Attorney, Agent, or Firm* — Procopio, Cory, Hargreaves & Savitch LLP

(57) ABSTRACT

In order to overcome problems that a UE may face in determining a default beam for communication with the base station during a COT, a method, apparatus, and computer-readable medium are provided for a base station to indicate to the UE which CORESET(s), QCL assumptions, UL resources, and/or spatial relationships are selected for a COT. A UE receives, from a base station, an indication corresponding to a COT. The indication is for at least one of a set of CORESETs, a set of QCL assumptions, a set of UL resources, or a set of spatial relations for determining a default beam. The UE determines the default beam from the base station for use during the COT based on the indication. The UE transmits or receives a transmission using the default beam.

30 Claims, 12 Drawing Sheets

(51) Int. Cl.
*H04W 72/04* (2009.01)
*H04L 5/00* (2006.01)
*H04W 72/12* (2009.01)

(58) Field of Classification Search
CPC .......... H04W 72/0446; H04W 72/1273; H04L 5/005; H04L 5/0023; H04L 5/0048; H04L 5/0053
See application file for complete search history.

(56) References Cited

U.S. PATENT DOCUMENTS

| | | | |
|---|---|---|---|
| 2019/0190747 A1* | 6/2019 | Park | H04L 5/0057 |
| 2019/0215701 A1* | 7/2019 | Honglei | H04L 1/1848 |
| 2019/0230730 A1* | 7/2019 | Wang | H04W 76/19 |
| 2019/0268883 A1* | 8/2019 | Zhang | H04L 5/00 |
| 2019/0268961 A1* | 8/2019 | Tsai | H04W 74/0833 |
| 2019/0280835 A1* | 9/2019 | Maattanen | H04L 5/0048 |
| 2019/0356524 A1* | 11/2019 | Yl | H04L 5/0094 |
| 2019/0357252 A1* | 11/2019 | Sun | H04W 74/0808 |
| 2020/0146058 A1* | 5/2020 | Xu | H04L 5/0092 |
| 2020/0154474 A1* | 5/2020 | Lo | H04W 74/0808 |
| 2020/0280859 A1* | 9/2020 | Kim | H04L 5/00 |
| 2020/0288479 A1* | 9/2020 | Xi | H04B 7/02 |
| 2021/0092622 A1* | 3/2021 | Tiirola | H04L 1/0038 |

OTHER PUBLICATIONS

International Search Report and Written Opinion—PCT/US2019/058211—ISA/EPO—dated Jan. 27, 2020.

\* cited by examiner

DEFAULT BEAM SELECTION BASED ON A SUBSET OF CORESETS

CROSS-REFERENCE TO RELATED APPLICATION(S)

This application claims the benefit of U.S. Provisional Application Ser. No. 62/780,175, entitled "DEFAULT BEAM SELECTION BASED ON A SUBSET OF CORESETS" and filed on Dec. 14, 2018, which is expressly incorporated by reference herein in its entirety.

BACKGROUND

Technical Field

The present disclosure relates generally to communication systems, and more particularly, to wireless communication during a Channel Occupancy Time (COT).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In licensed communication bands, a default UE reception (Rx) beam may be quasi co-located (QCL) with a lowest Control Resource Set Identifier (CORESET ID) in the latest monitored slot. However, communication in unlicensed frequency bands may be limited to a COT based on performance of a Clear Channel Assessment (CCA). The shared nature of the medium may lead to use of only a subset of CORESETs or CORESET QCL assumptions in a given COT. For example, a base station might only perform or succeed in performing a CCA on certain beams. Thus, the base station might not use CORESET resources associated with other beams in the COT. This may lead to problems for the UE in determining default beams for communication with the base station during the COT.

Aspects presented herein improve communication between the base station and the UE through the base station indicating to the UE which CORESET(s) or QCL assumptions are selected for a COT. The UE may use the indication to determine a default beam for the communication. Similarly, the base station may indicate selected uplink (UL) resources or spatial relationships for the COT that the UE may use to determine a default beam.

In an aspect of the disclosure, a method, a computer-readable medium, and an apparatus are provided. The apparatus determines whether an indication corresponding to a COT is received from a base station, wherein the indication is for at least one of a set of CORESETs, a set of QCL assumptions, a set of UL resources, or a set of spatial relations for determining a default beam. The apparatus determines the default beam from the base station for use during the COT based on the indication if the indication is received from the base station. The apparatus then transmits or receives a transmission using the default beam.

In another aspect of the disclosure, a method, a computer-readable medium, and an apparatus are provided. The apparatus indicates, to a UE at least one of a set of CORESETs, a set of QCL assumptions, a set of UL resources, or a set of spatial relations for determining a default beam, the indication being for use in determining a default beam for use in a COT. The apparatus then transmits or receives communication with the UE based on the default beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
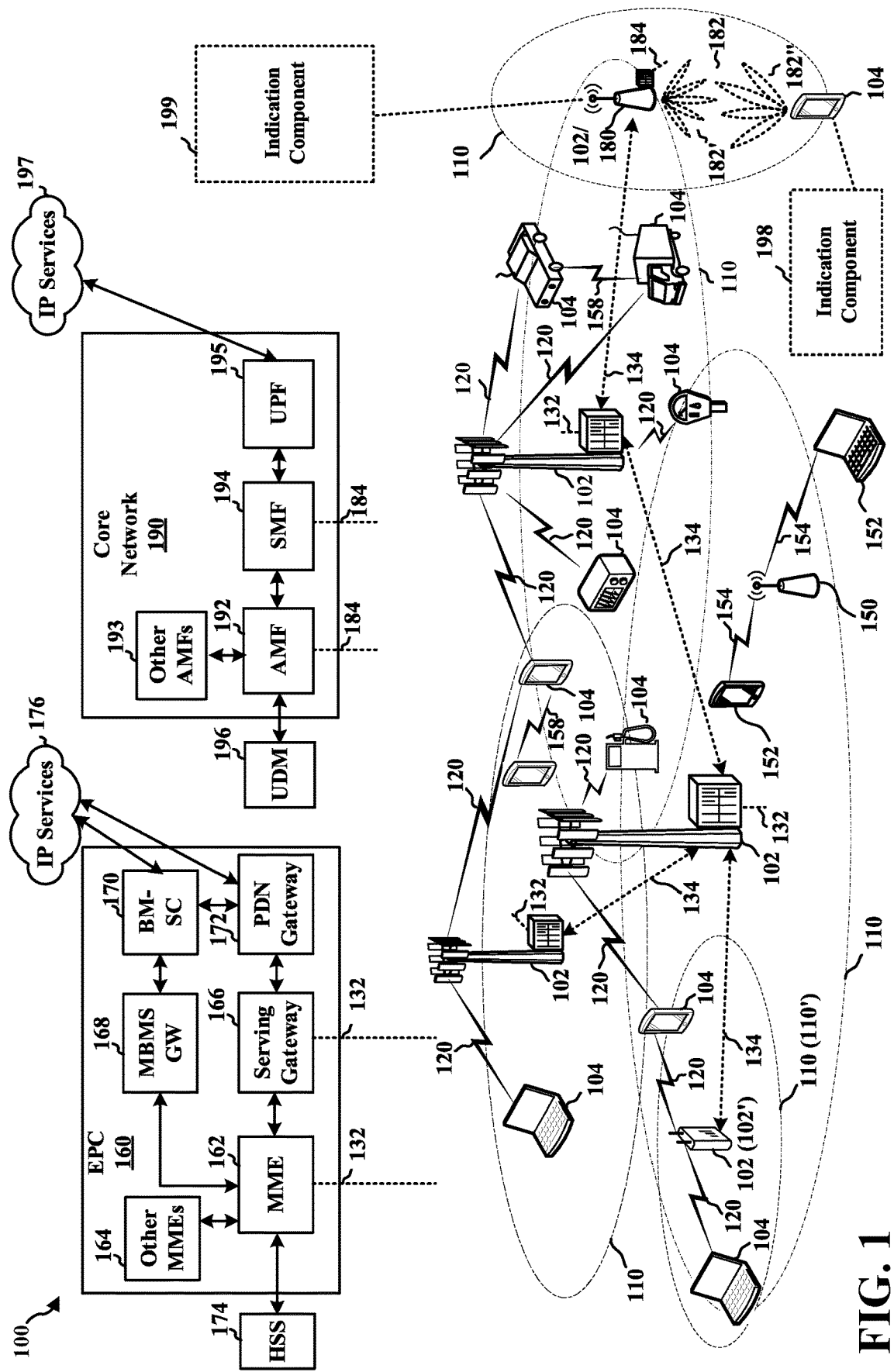
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB (e.g., base station 180) operates in mmW or near mmW frequencies, the 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (e.g., base station 180) may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a streaming service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise an indication component 198 configured to determine whether an indication corresponding to a COT is received from a base station, wherein the indication is for at least one of a set of CORESETs, a set of QCL assumptions, a set of UL resources, or a set of spatial relations for determining a default beam and to determine the default beam from the base station for use during the COT based on the indication if the indication is received from the base station. The UE 104 may be configured to transmit or receive a transmission using the default beam.

Referring again to FIG. 1, in certain aspects, the base station 102/180 may comprise an indication component 199 configured to indicate, to a UE, at least one of a set of CORESETs, a set of QCL, a set of UL resources, or a set of spatial relations for determining a default beam, the indication being for use in determining a default beam COT. The base station 102/180 may be configured to transmit or receive communication with the UE based on the default beam.

Figure 2:
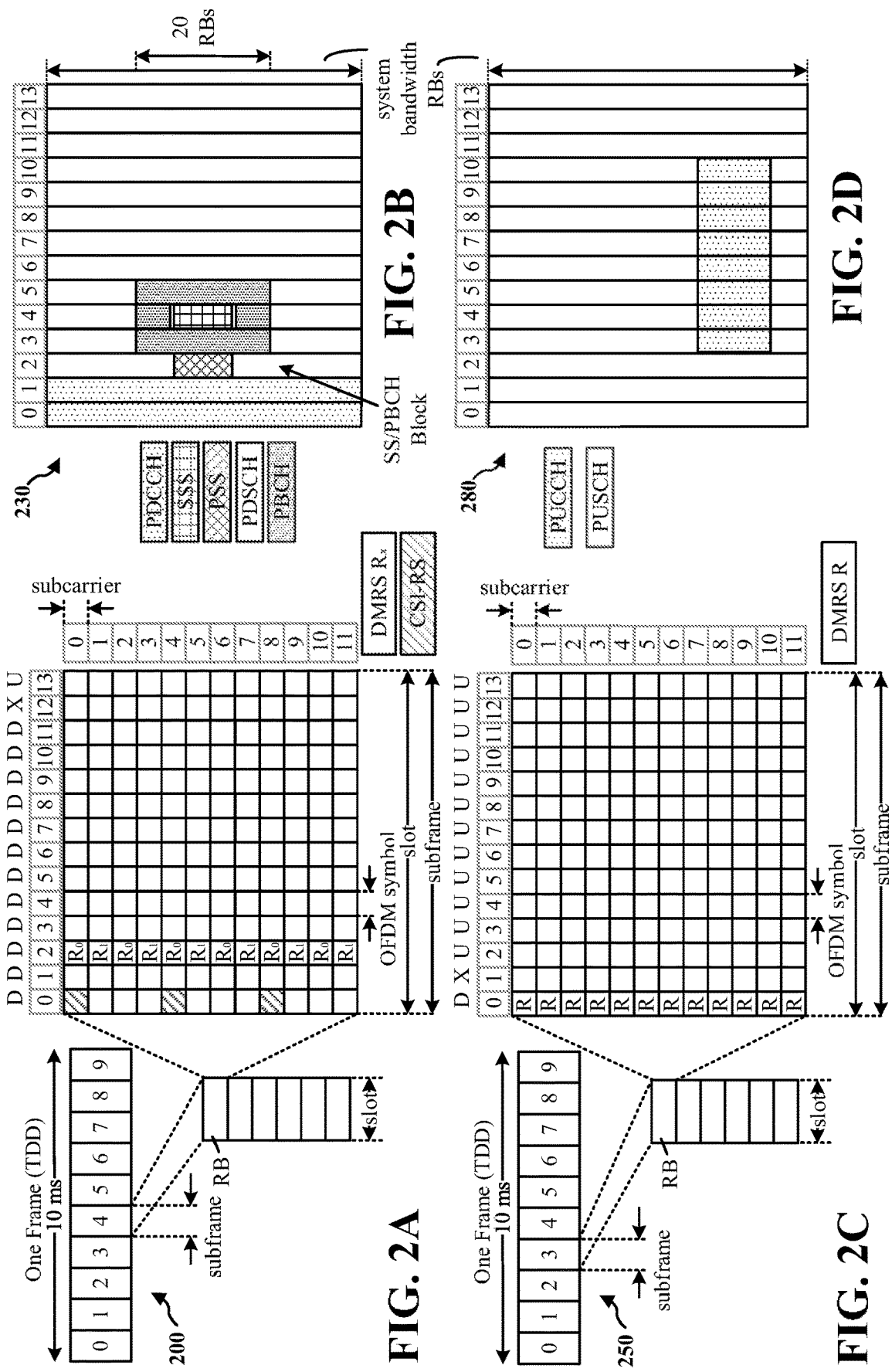
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplex (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/not-acknowledgement (NACK) feedback. The PUSCH carries data, and may additionally be used to carry a buffer status report (BSR), a power headroom report (PHR), and/or UCI.

Figure 3:
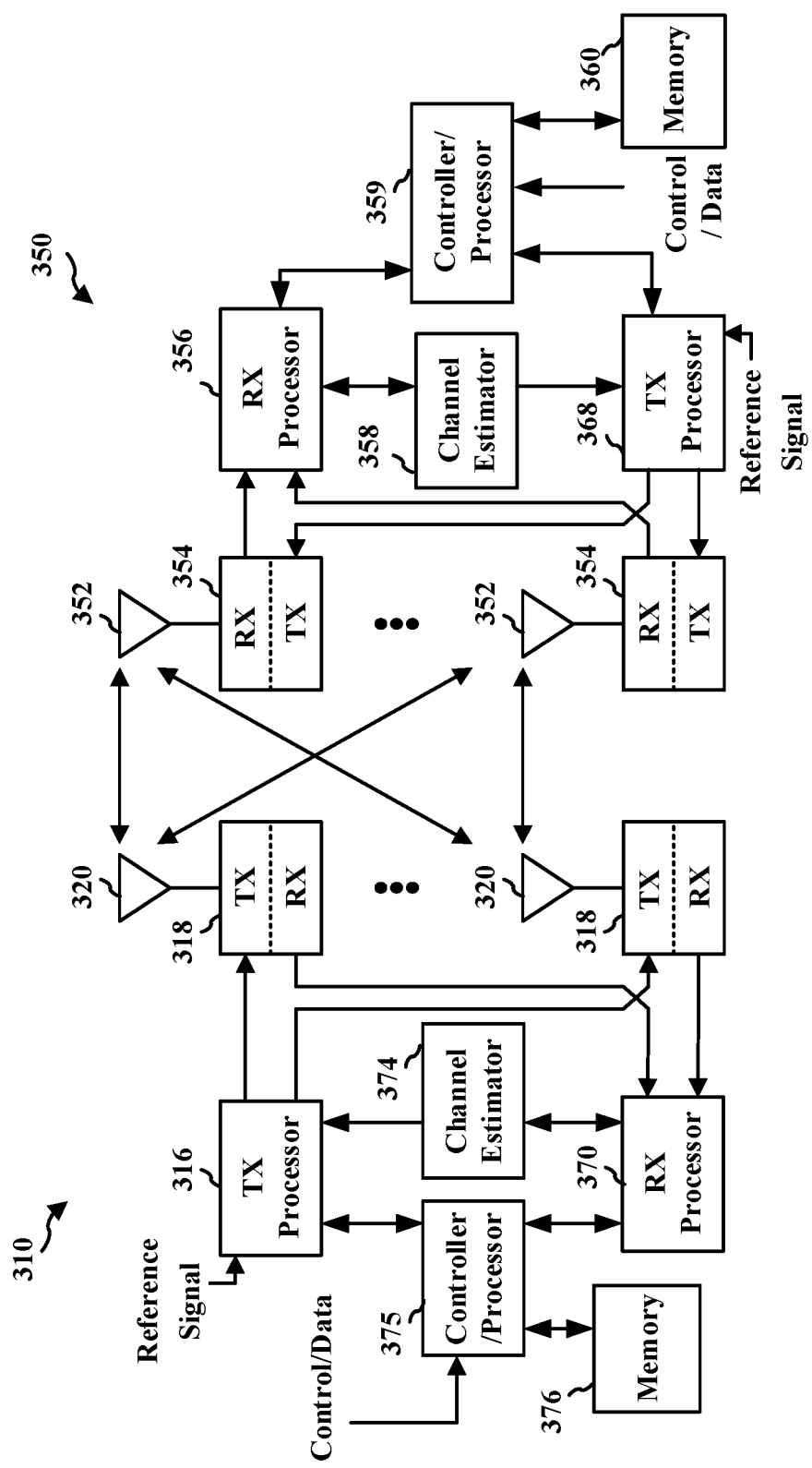
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
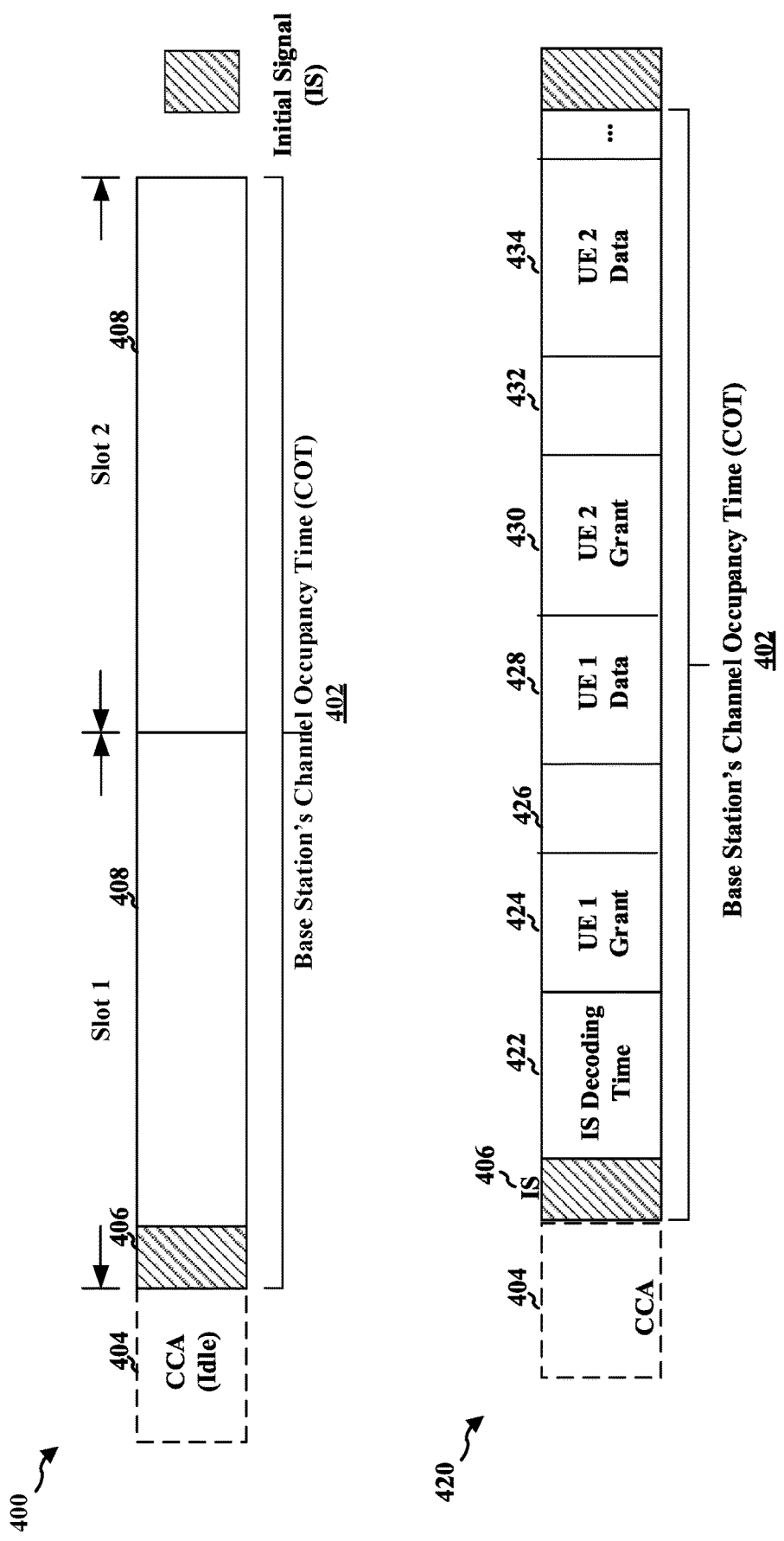
FIG. 4 illustrates an example COT.

FIG. 4 depicts a diagram 400 illustrating an example COT 402 for a base station, e.g., for transmitting and/or receiving communication using an unlicensed frequency band. In unlicensed bands where the transmission medium is generally shared among multiple devices (e.g. 60 GHz), the base station may first perform a clear channel assessment (CCA), e.g., at 404, to determine if the medium is available for use by the base station. If the CCA clears (i.e. the base station is successful in its contention for the medium), the base station may use the channel for the duration of a COT 402 to schedule grants and transmit/receive data with one or more UEs. A CCA may be an assessment of energy received on a radio interface. A lack of energy on the radio interface for a particular channel may indicate that a channel is clear. A CCA idle period may be a period when a device may be idle on the channel so that channel assessment may occur. The COT may be a period when a base station has secured the channel for a transmission, e.g., a data transmission, or when a base station has secured the channel for transmissions by other devices, e.g., a UE. The base station may inform the UE that it controls the medium by transmitting an initial signal (IS) 406 at the beginning of the COT, discussed infra. While the COT 402 in diagram 400, is illustrated as spanning two slots, two slots is merely one example of a COT duration to illustrate the concept. The COT may span any number of slots 408. The IS 406 may provide an indication to the UE informing the UE to monitor for further communication from the base station during the COT.

FIG. 4 also illustrates an example block diagram 420 depicting a base station's transmissions to a UE during the COT 402. Once the base station successfully performs a CCA 404, the base station may transmit an IS 406 at the beginning of the COT. The IS 406 informs the UE that the base station has acquired the channel and is able to transmit a grant and/or data to the UE. In one aspect, the IS 406 may include Group Common Physical Downlink Control Channel (GC-PDCCH) information or a reference signal (e.g. a Channel State Information Reference Signal (CSI-RS)). In another aspect, the IS 406 may include control information such as a control resource set (CORESET). The UE decodes the received IS over a decoding period 422, and the UE may determine that it should monitor the channel for communications from the base station. During the decoding period 422, the UE does not monitor for communication from the base station. Following the decoding period 422, the UE may receive a grant for a DL data transmission, receive a grant for an UL data transmission, receive DL data, and/or transmit UL data. For example, the UE may then receive a scheduling grant 424 containing downlink control information (DCI) for DL/UL communication. The corresponding data 428 may be communicated at 426. There may be an offset 426 between the grant and the corresponding transmission/reception of data 428. The base station may communicate with a single UE in the COT or may communicate with multiple UEs during the COT. In an example involving communication with multiple UEs, the base station may send UE-specific grants and data during the COT. For example, diagram 420 of FIG. 4 illustrates UE-1 receiving its own scheduling grant 424 followed after an offset 426 by its corresponding data 428 (either DL or UL data), and UE-2 receiving its own scheduling grant 430 followed after an offset 432 by its corresponding data 434.

In order to receive the communication from the base station, the UE may need to determine a reception beam from among a plurality of potential reception beams. While a UE communicating in the licensed band may simply follow a relationship in which a default reception beam is QCL with a lowest CORESET ID from a latest monitored slot, this relationship may lead to problems when applied in communication in the unlicensed frequency spectrum.

Figure 5:
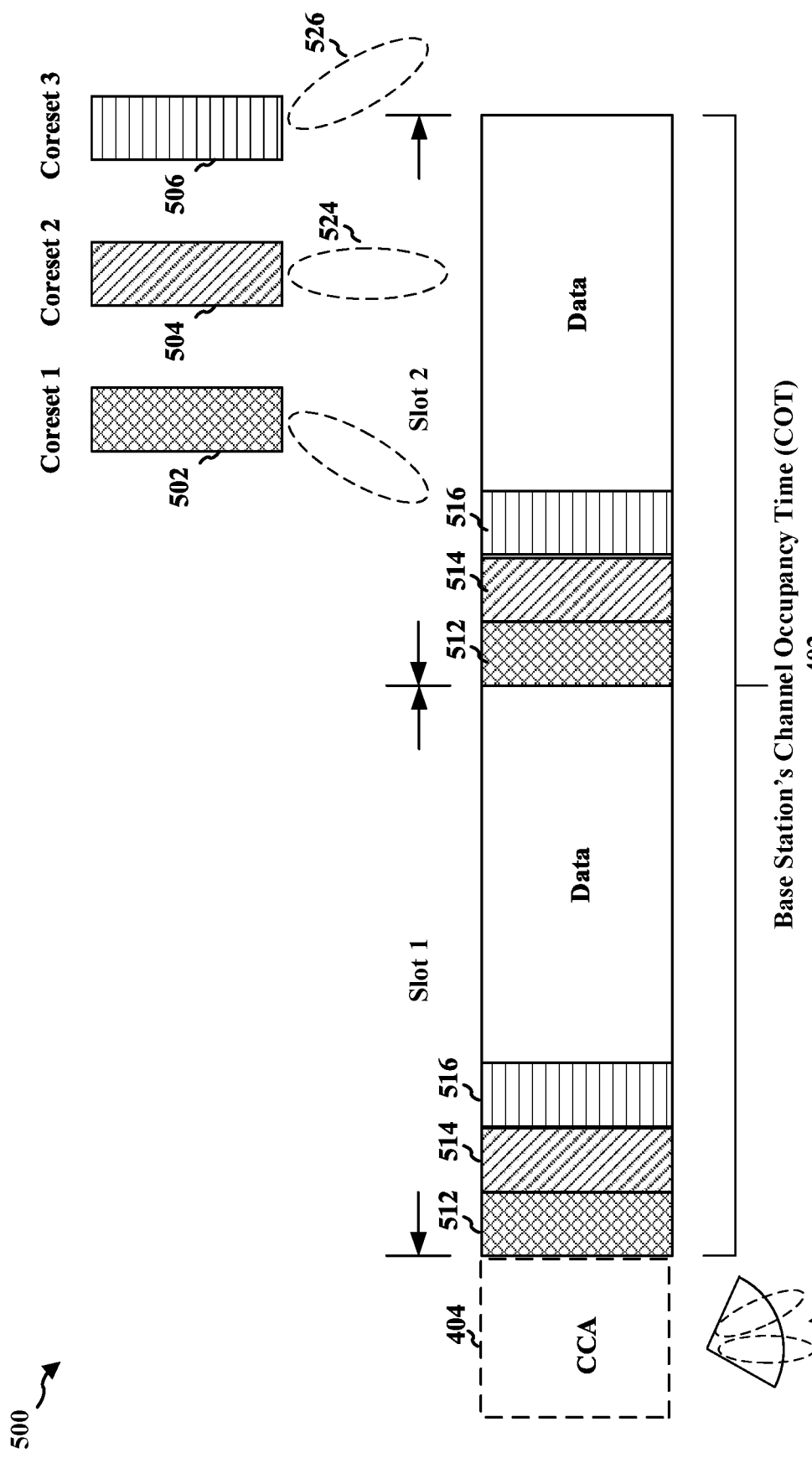
FIG. 5 illustrates an example of CORESETs within a COT.

FIG. 5 illustrates an example block diagram 500 depicting CORESETs IDs 502, 504, 506 associated with corresponding resources 512, 514, 516 within slots. Each CORESET may indicate where the UE may receive PDCCH transmissions and may include reference signals (e.g. Synchronization Signal Block (SSB), CSI-RS, etc.) corresponding to a particular spatial filter or beam. For example, CORESET 1 502 may be associated with a beam 522 having a first direction, CORESET 2 504 may be associated with a beam 524 having a second direction, and CORESET 3 506 may be associated with a beam 526 having a third direction. Each CORESET may also include a transmission configuration indication (TCI) state which provides information about the antenna ports with which the packet common control channel (PCCCH) antenna ports are quasi co-located. The UE may receive one or more CORESETs from the base station at the beginning of any slot.

If a UE selects the default UE reception (Rx) beam based on QCL corresponding to the lowest CORESET ID in the latest monitored slot, the selection could lead to the UE using a beam for which CCA was not performed or was not successful. For example, referring to FIG. 5, if Slot 2 was the latest slot and CORESET 1 had the lowest CORESET ID, then assuming spatial quasi-location between PDCCH and PDSCH antenna ports, the UE may select a default Rx beam to receive data on PDSCH in Slot 2 associated with CORESET 1, e.g., beam 522. However, in this example, the base station has not checked beam 1 and will not use CORESET 1 that corresponds to beam 1. Thus, selection of the subset of CORESET QCL for transmission in a given COT may lead the UE to determine an incorrect default Rx/Tx beam and may degrade communication between the UE and the base station. Similarly, the UE may rely on a QCL assumption for determining a default Rx/Tx beam that is not consistent with the set of QCL assumptions selected by the base station.

Figure 6:
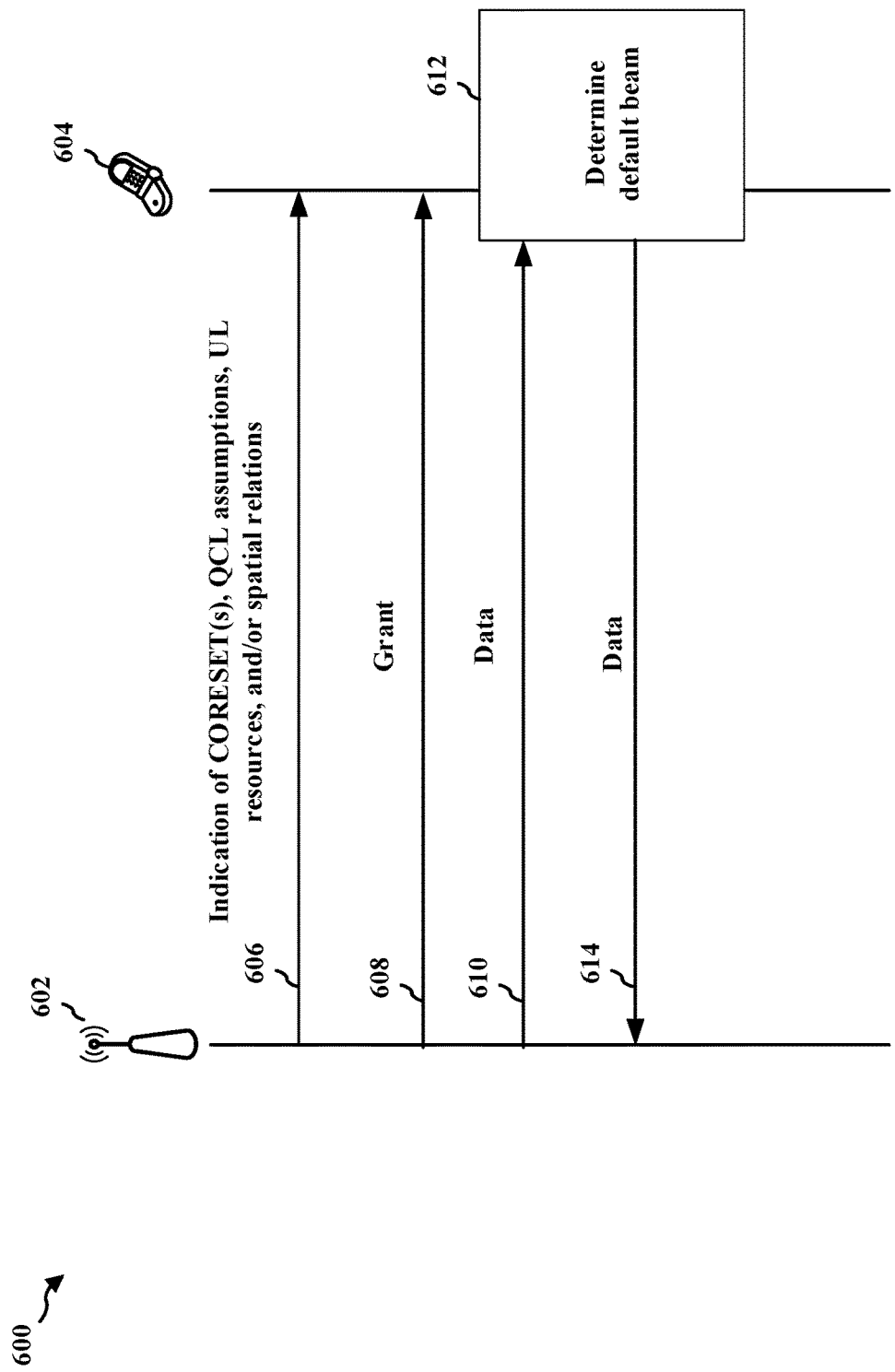
FIG. 6 illustrates an example communication flow between a base station and a UE.

In order to address this problem, a base station may indicate to the UE(s) selected CORESET(s) (e.g., CORE- SET 2 and CORESET 3 in FIG. 5) from among the possible CORESETs or selected CORESET QCLs from among the possible QCL assumptions for use in a given COT 402, e.g., as illustrated at 606 in FIG. 6. The selection may be based on the beams used by the base station to perform CCA and/or the beams for which CCA was successful. The default beam (e.g., from among beam 1, beam 2, beam 3) may be determined based on the selected subset of CORESETs (CORESET 2, or CORESET 3) or selected CORESET QCLs rather than from the entire set of CORESETs or from the entire set of QCL assumptions. A QCL assumption is a relationship that indicates that the Rx/Tx signal will share properties with another signal. For example, the Rx/Tx beam may have a defined relationship to the beam used for another signal, e.g., a reference signal. Thus, the QCL assumption provides the relationship defining the properties that are shared between the Rx/Tx signal and the other signal. There may be a set of potential QCL assumptions, and the base station may select a subset of the QCL assumptions for use in a particular COT. Aspects described herein may include a base station signaling information about the selected CORESET(s) or the selected CORESET QCL(s). Aspects described herein may also include the UE receive the information about the selected CORESET(s) or the selected CORESET QCL(s) and use the information to select a default reception beam for communication with the base station.

The concept of QCL may be used to improve the channel estimation performance. One channel on one antenna port may be estimated using information about the channel on another antenna port. One antenna port may be considered QCL to another antenna port when they have the same or similar properties. The two antenna ports may have the same or similar properties because they are located near each other in space, oriented the same or similar in space, the antennas used have similar properties, or some combination of these or other aspects of the antennas lead to the antennas having similar properties.

For example, antennas may be considered to be QCL based on one or more of frequency shift, received power for each antenna port, Doppler spread, Doppler shift, delay spread, average gain, an average delay, received timing, a number of significant channel taps, or some combination of these or other figures of merit related to the antenna ports. For QCL antenna ports, one or more of these figures of merit are the same or similar for each of the antenna ports that are considered QCL. One or more of these properties may be determined based on received reference signals or other received signals.

FIG. 6 illustrates an example communication flow 600 between a base station 602 and a UE 604 including aspects presented herein. The UE may determine whether an indication of a set of CORESET(s) or a set of QCL assumption(s) is received from the base station 602. If the CORESETs/QCL assumptions selected by the base station are indicated to the UE at 606, the UE may determine, at 612, a default reception beam based on the indicated set. For example, the UE may use a default Rx beam based on the lowest CORESET ID from among the indicated set or based on a QCL assumption having a lowest identifier. The selected set of CORESETs/QCL assumptions may be based on beams for which the base station performs CCA and/or succeeds in performing CCA. Following the determination of the default beam, the UE may use the default beam to receive data 610 and/or to transmit data 614. FIG. 6 also illustrates a grant 608 that may correspond to a grant for DL data 610 or UL data 614.

If selected CORESET QCLs are indicated, the CORESETs whose QCLs are not selected may follow one of selected CORESET QCL based on certain rule. For example, if a CORESET with an un-selected QCL is used to transmit to the UE, the data received in connection with the CORESET may be transmitted and/or received based on a QCL of the lowest CORESET ID from among the CORESETs with selected QCLs or from among the selected set of CORESETs. Thus, a default reception beam may follow a QCL relationship with a lowest CORESET ID from among the CORESETs selected by the base station and indicated to the UE at 606. Likewise, a default reception beam may follow a QCL relationship with a lowest CORESET ID from among the QCL assumptions selected by the base station and indicated to the UE at 606.

In addition to indicating a subset of CORESETs/QCL assumptions at 606 for determining a default Rx beam, the base station may also indicate a subset of UL resources and/or a subset of spatial relations for particular signals, at 606. The indication of a subset of UL resources and/or subset of spatial relations for particular signals may be used by the UE, at 612, to determine a default transmission beam, e.g., to transmit data 614. The UL resources indicated at 606 may include any of SRS, PUCCH, and/or PUSCH. The spatial relations that may be indicated to the UE, at 606, can include those used for SRS/PUCCH/PUSCH, and default Tx beam that is determined at 612 can be used for PUCCH/PUSCH/SRS. For example, a base station can indicate, at 606, a subset of PUCCH resources, e.g., selected Tx beams, whose beams are allowed by listen before talk (LBT) or CCA in a base station initiated COT. A Tx beam of PUSCH scheduled by DCI format 0_0 in the COT may follow Tx beam of lowest PUCCH resource among the subset of selected PUCCH resources in an active bandwidth part (BWP).

The indication 606 may be made to the UE in any of a number of ways. For example, the base station may explicitly signal the selected CORESETs, QCL assumptions, UL resources, and/or spatial relations to the UE. A base station may explicitly signal CORESETs or CORESET QCLs in PDCCH, such as in a group common PDCCH at the beginning of COT. For example, the indication of a set of CORESETs selected from a plurality of CORESETS or a set of QCL assumptions selected from a plurality of QCL assumptions may include signaling identifying the set of CORESETS or the set of QCL assumptions. The indication may be included in a control channel received in the at least one COT.

In another example, the indication may be implicitly signaled to the UE. For example, the base station may signal such information to the UE in CSI-RS resources with the same QCLs as the selected CORESET(s)/QCL assumptions. The CSI-RS resources may be at the beginning of a COT, so that the UE can determine the beam(s) for use during the COT.

Figure 7:
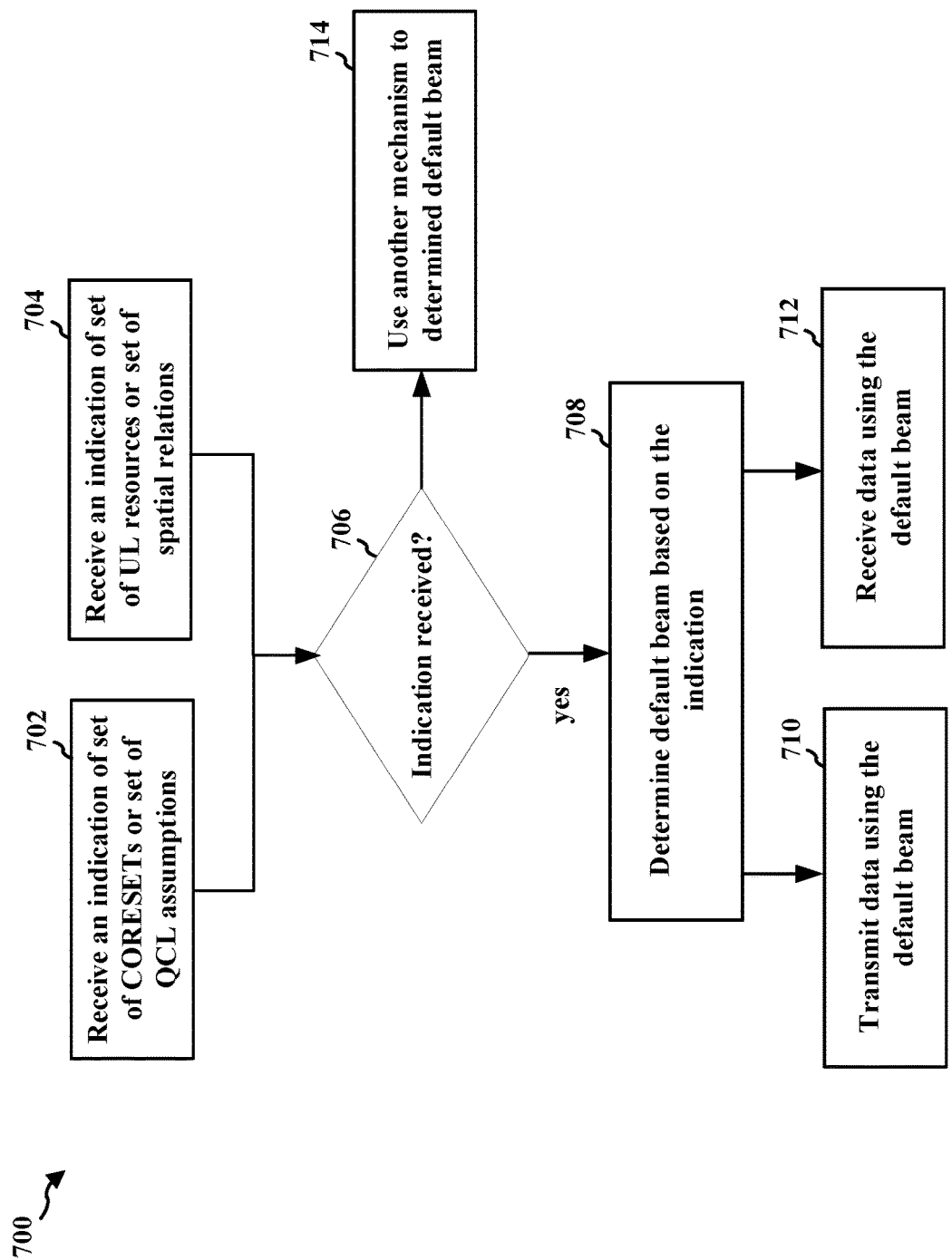
FIG. 7 is a flowchart of a method of wireless communication.

FIG. 7 is a flowchart 700 of a method of wireless communication. The method may be performed by a UE or a component of a UE (e.g., the UE 104, 350, 604, 1150; the apparatus 802/802'; the processing system 914, which may include the memory 360 and which may be the entire UE 350 or a component of the UE 350, such as the TX processor 368, the RX processor 356, and/or the controller/processor 359). According to various aspects, one or more of the illustrated operations of the method 700 may be omitted, transposed, and/or contemporaneously performed. The UE may implement the method of diagram 600. The method may enable a UE to more accurately determine a default beam when communicating with a base station using beamforming over an unlicensed spectrum.

At 706, the UE determines whether an indication corresponding to a COT is received from a base station. For example, 706 may be performed by indication component 808 of apparatus 802. In some aspects, the indication may be for at least one of a set of CORESETs, a set of QCL assumptions, a set of UL resources, or a set of spatial relations for determining a default beam.

At 708, the UE determines the default beam from the base station for use during the COT. For example, 708 may be performed by default beam component 810 of apparatus 802. In some aspects, the UE determines the default beam from the base station for use during the COT based on the indication if the indication is received from the base station. Otherwise, the UE may determine the default beam in another manner at 714.

The UE may then communicate during the COT using the default beam. In some aspects, for example, at 710, the UE may transmit a transmission using the default beam. For example, 710 may be performed by transmission component 806 of apparatus 802. In some aspects, for example, at 712, the UE may receive a transmission using the default beam. For example, 712 may be performed by reception component 804 of apparatus 802.

In some aspects, for example, at 702, the UE may receive the indication of the set of CORESETs or of the set of QCL assumptions. For example, 702 may be performed by reception component 804 of apparatus 802. In some aspects, the default beam may comprise a default reception beam that may be selected based on a lowest CORESET identifier (ID) from among the set of CORESETs or the set of QCL assumptions. In some aspects, for a CORESET that is not comprised in the set of CORESETs, the UE may determine the default beam based on a lowest CORESET ID from among the set of CORESETs or the set of QCL assumptions.

In some aspects, for example, at 704, the UE may receive the indication of the set of UL resources or the set of spatial relations for determining the default beam. For example, 704 may be performed by reception component 804 of apparatus 802. In some aspects, the default beam may comprise a default transmission beam that may be selected based on the indication of the set of UL resources or the set of spatial relations for determining the default beam. The UL resources may correspond to at least one of a Sounding Reference Signal (SRS), an uplink control channel, or an uplink data channel. The spatial relations for determining the default beam may comprise spatial relations for selecting at least one of a Sounding Reference Signal (SRS), an uplink control channel, or an uplink data channel for an uplink transmission from the UE. The indication may comprise UL resources for a first uplink channel, and wherein the UE determines the default beam for a second uplink channel based on a beam used for the first uplink channel.

Figure 8:
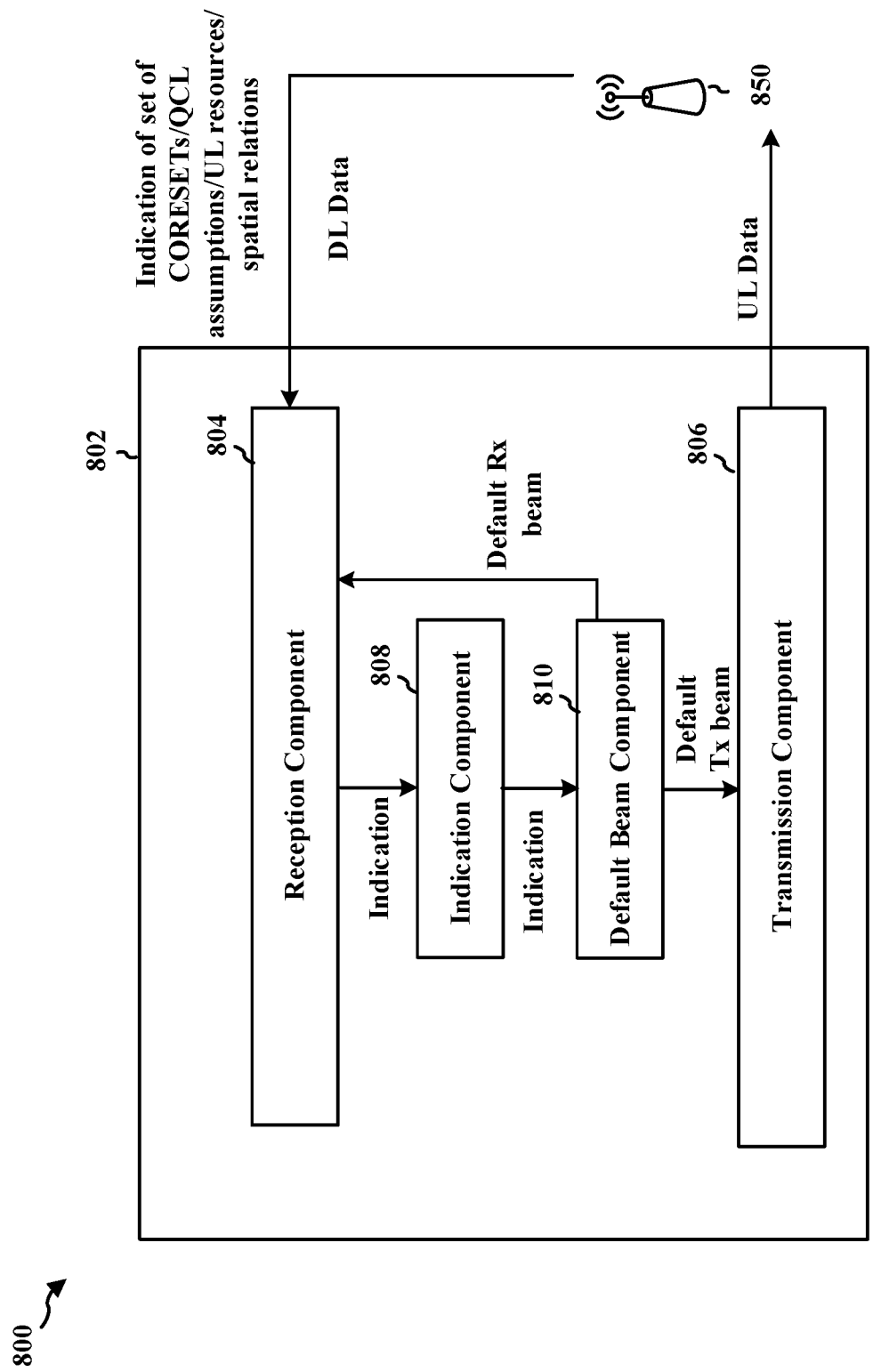
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE or a component of a UE. The apparatus may perform the method of flowchart 700. The apparatus includes an indication component 808 configured to determine whether an indication corresponding to a COT is received from a base station, wherein the indication is for at least one of a set of CORESETs, a set of QCL assumptions, a set of UL resources, or a set of spatial relations for determining a default beam, e.g., as described in connection with 706 of FIG. 7. The apparatus comprises a default beam component 810 configured to determine the default beam from the base station for use during the COT based on the indication if the indication is received from the base station, e.g., as described in connection with 708 of FIG. 7. The reception component 804 is configured to receive receiving a transmission from base station 850 using the default beam, e.g., as discussed in connection with 712 of FIG. 7. The transmission component 806 is configured to transmit a transmission using the default beam, e.g., as discussed in connection with 710 of FIG. 7. The indication component 808 may be configured to receive the indication of the set of CORESETs or of the set of QCL assumptions, wherein the default beam comprises a default reception beam that is selected based on a lowest CORESET ID from among the set of CORESETs or the set of QCL assumptions, e.g., as discussed in connection with 702 of FIG. 7. The indication component 808 may be configured to receive the indication of the set of CORESETs or of the set of QCL assumptions, wherein for a CORESET that is not comprised in the set of CORESETs, the UE determines the default beam based on a lowest CORESET identifier ID from among the set of CORESETs or the set of QCL assumptions, e.g., as discussed in connection with 702 of FIG. 7. The indication component 808 may be configured to receive the indication of the set of UL resources or the set of spatial relations for determining the default beam, wherein the default beam comprises a default transmission beam that is selected based on the indication of the set of UL resources or the set of spatial relations for determining the default beam, e.g., as discussed in connection with 704 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
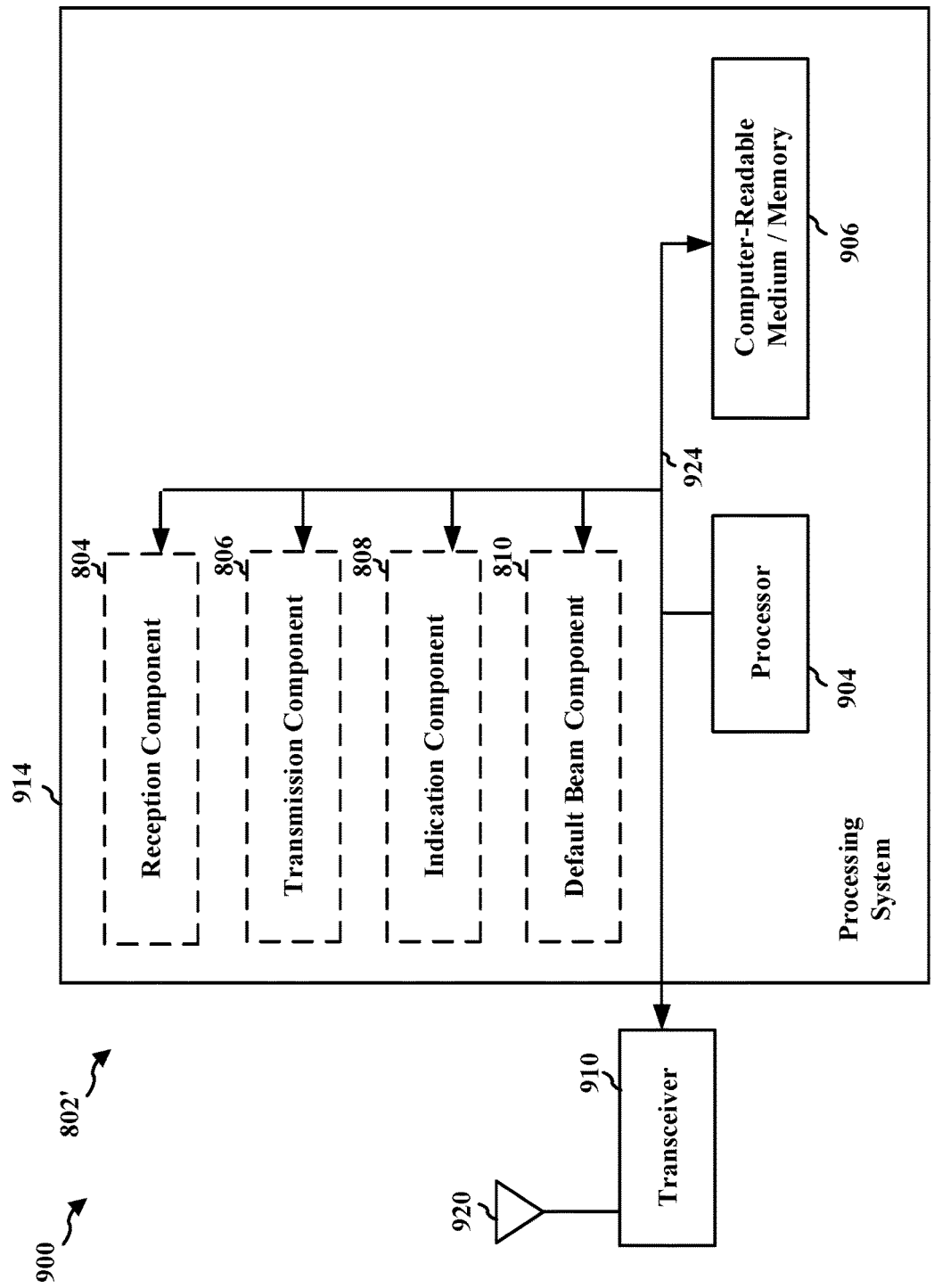
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining whether an indication corresponding to a COT is received from a base station. The indication is for at least one of a set of CORESETs, a set of QCL assumptions, a set of UL resources, or a set of spatial relations for determining a default beam. The apparatus includes means for determining the default beam from the base station for use during the COT based on the indication when the indication is received from the base station. The apparatus includes means for transmitting or receiving a transmission using the default beam. The apparatus further includes means for receiving the indication of the set of CORESETs or of the set of QCL assumptions. The default beam comprising a default reception beam that is selected based on a lowest CORESET ID from among the set of CORESETs or the set of QCL assumptions. The apparatus further includes means for receiving the indication of the set of CORESETs or of the set of QCL assumptions. For a CORESET that is not comprised in the set of CORESETs, the UE determines the default beam based on a lowest CORESET ID from among the set of CORESETs or the set of QCL assumptions. The apparatus further includes means for receiving the indication of the set of uplink resources or the set of spatial relations for determining the default beam. The default beam comprising a default transmission beam that is selected based on the indication of the set of uplink resources or the set of spatial relations for determining the default beam. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
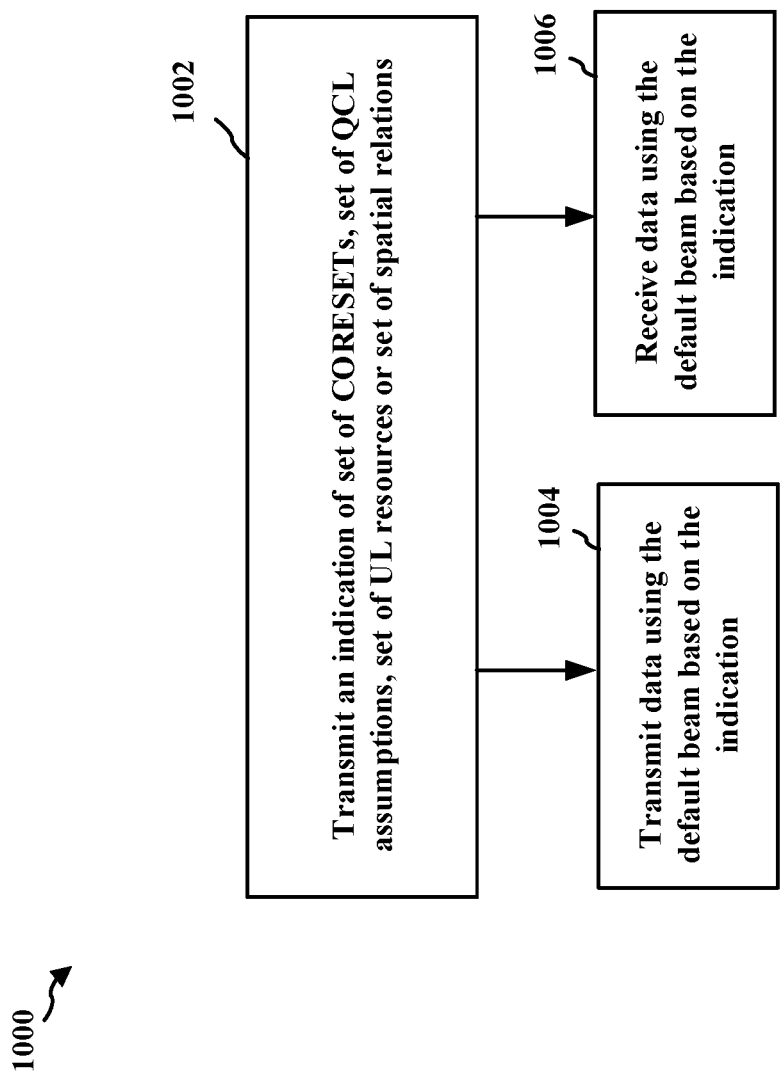
FIG. 10 is a flowchart of a method of wireless communication.

FIG. 10 is a flowchart 1000 of a method of wireless communication. The method may be performed by a base station or a component of a base station (e.g., the base station 102, 180, 310, 602, 850; the apparatus 1102/1102'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of the method 1000 may be omitted, transposed, and/or contemporaneously performed. The UE may implement the method of diagram 600. The method may enable a UE to more accurately determine a default beam when communicating with a base station using beamforming over an unlicensed spectrum.

At 1002, the base station transmits, to a UE, an indication of at least one of a set of CORESETs, a set of QCL assumptions, a set of UL resources, or a set of spatial relations for determining a default beam. For example, 1002 may be performed by indication component 1108 of apparatus 1102. In some aspects, the indication may be used in determining a default beam for use in a COT. An example indication 606 is described in connection with FIG. 6. The indication may be based on a CCA performed by the base station. In some aspects, the indication may indicate the set of CORESETs. In some aspects, the indication indicates the set of QCL assumptions. The default beam may be determined to be a default reception beam. In some aspects, the indication indicates the set of uplink resources. The default beam may comprise a default transmission beam. The uplink resources may comprise at least one of a SRS, an uplink control channel, or an uplink data channel. The indication may indicate the set of spatial relations for determining the default beam, and the default beam may comprise a default transmission beam. In some aspects, the set of spatial relations for determining the default beam comprise spatial relations for selecting at least one of a SRS, an uplink control channel, or an uplink data channel. In some aspects, the indication may comprise uplink resources for a first uplink channel, and the default beam for a second uplink channel may be indicated based on a beam used for the first uplink channel.

At 1004, the base station may transmit a transmission to the UE based on the default beam based on the indication transmitted at 1002. For example, 1004 may be performed by transmission component 1106 of apparatus 1102. In some aspects, the indication may indicate the set of CORESETs, and may provide the UE with information to determine a default reception beam. In some aspects, the indication may indicate the set of QCL assumptions, and may provide the UE with information to determine a default reception beam.

At 1006, the base station may receive a transmission from the UE based on a default beam based on the indication transmitted at 1002. For example, 1006 may be performed by reception component 1104 of apparatus 1102. In some aspects, the indication may indicate the set of UL resources, and may provide the UE with information to determine a default transmission beam. The UL resources may comprise at least one of an SRS, an uplink control channel, or an uplink data channel. As another example, the indication may indicate the set of spatial relations for determining a default transmission beam. The spatial relations for determining the default beam may comprise spatial relations for selecting at least one of an SRS, an uplink control channel, or an uplink data channel. The indication may comprise UL resources for a first uplink channel, and wherein the default beam for a second uplink channel is indicated based on a beam used for the first uplink channel.

Figure 11:
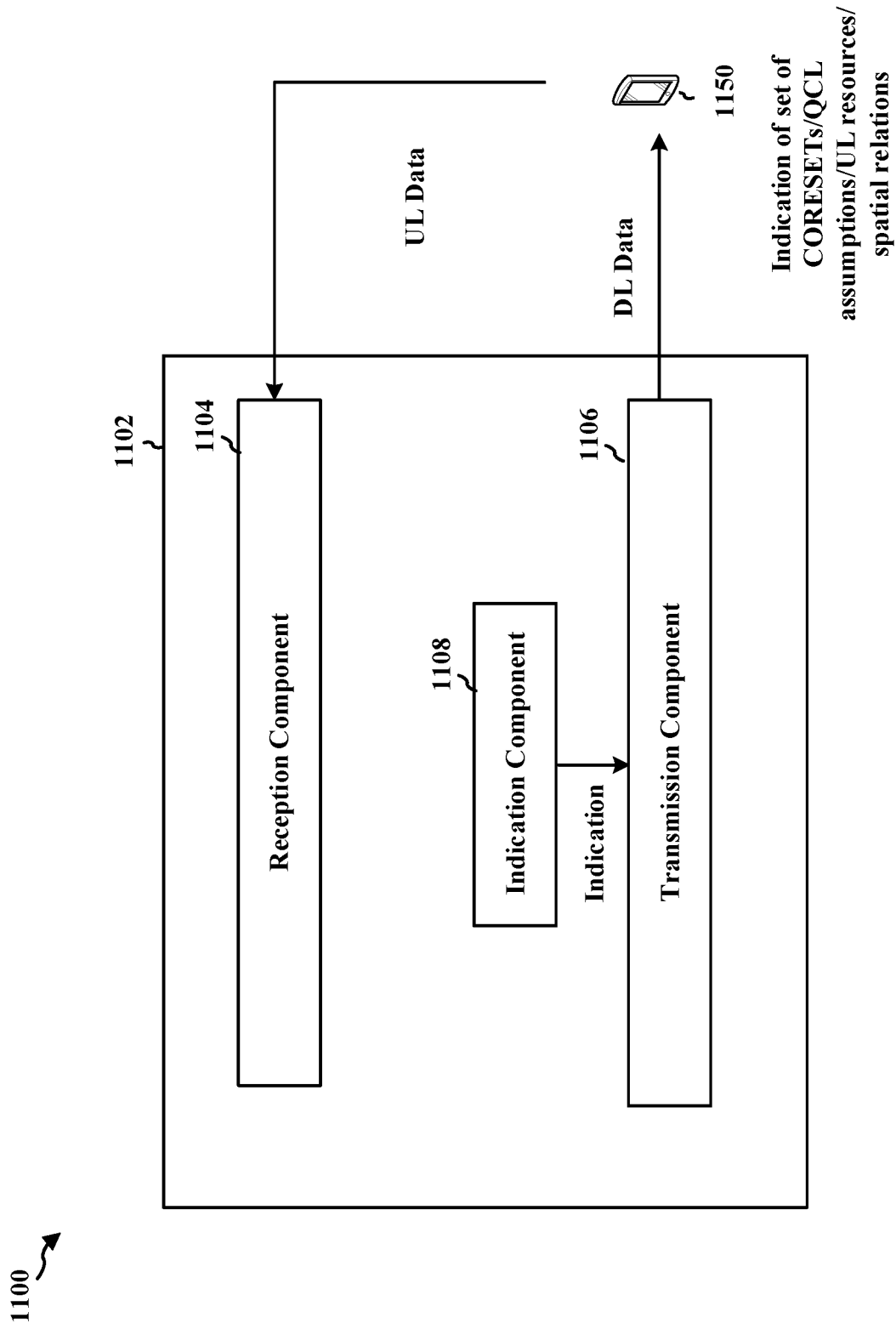
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station or a component of a base station. The apparatus may perform the method of flowchart 1000. The apparatus includes an indication component 1108 configured to transmit, to a UE (e.g. UE 1150), an indication of at least one of a set of CORESETs, a set of QCL assumptions, a set of UL resources, or a set of spatial relations for determining a default beam, the indication being for use in determining a default beam for use in a COT, e.g., as described in connection with 1002 of FIG. 10. The apparatus includes a reception component 1104 configured to receive a transmission from the UE based on the default beam, e.g., as described in connection with 1006 of FIG. 10. The apparatus includes a transmission component 1106 configured to transmit a transmission to the UE based on the default beam, e.g., as described in connection with 1004 of FIG. 10.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
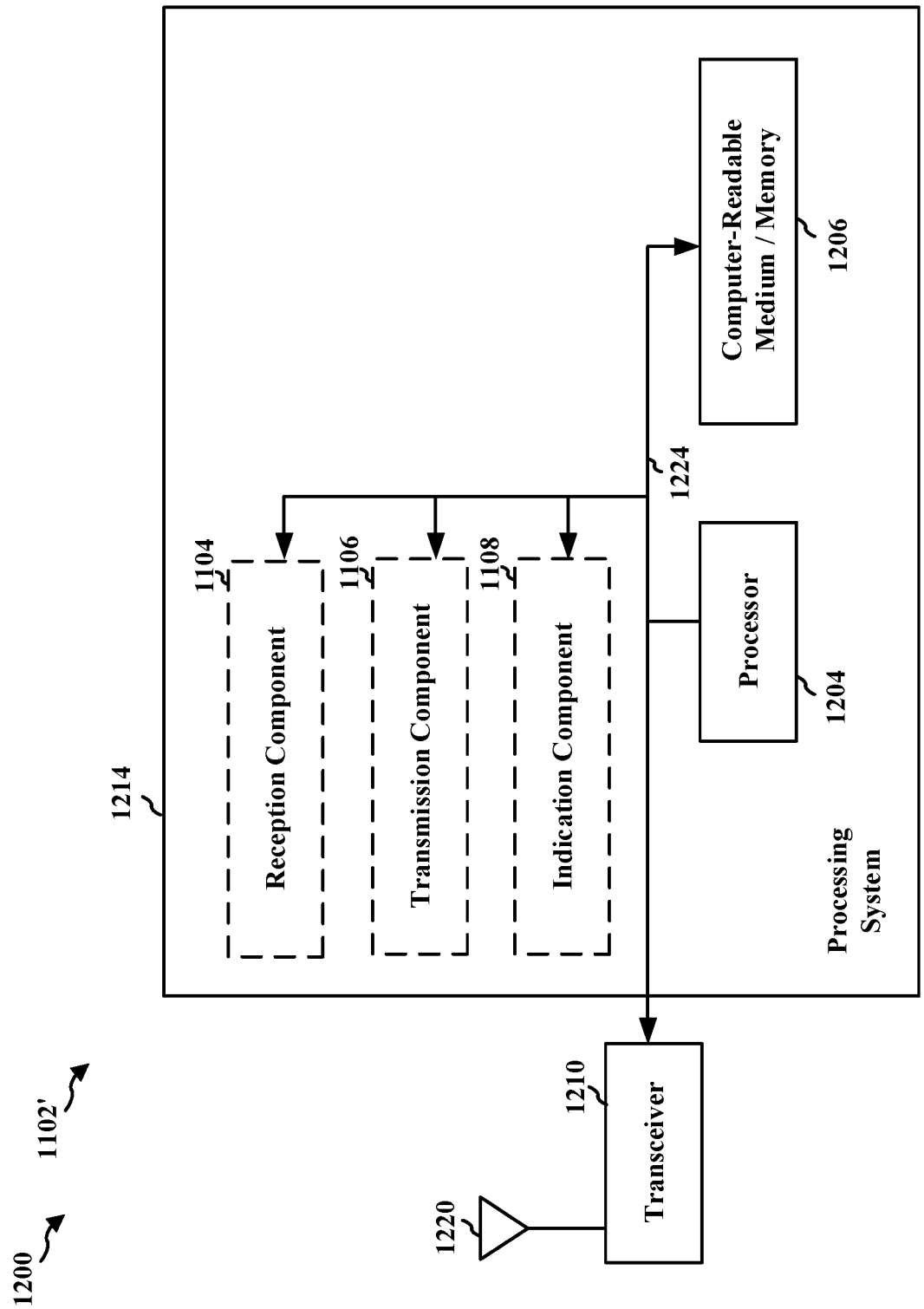
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1204. In addition, the transceiver 1210 receives information from the processing system 1214, specifically the transmission component 1206, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375

In one configuration, the apparatus 1102/1102' for wireless communication includes means for sending, to a UE, an indication of at least one of a set of CORESETs, a set of QCL assumptions, a set of UL resources, or a set of spatial relations for determining a default beam. The indication being for use in determining a default beam for use in a COT. The apparatus includes means for transmitting a transmission to the UE based on the default beam. The apparatus includes means for receiving a transmission from the UE based on the default beam. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure relates to communication enhancements between the base station and the UE through the base station indicating to the UE which CORESET(s) or QCL assumptions are selected for a COT. The UE may use the indication to determine a default beam for the communication. In addition, the base station may indicate selected uplink (UL) resources or spatial relationships for the COT that the UE may use to determine a default beam. At least one advantage of the disclosure is that the UE may be configured to more accurately determine a default beam when communicating with a base station using beamforming over an unlicensed spectrum.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving, from a base station, an indication corresponding to a Channel Occupancy Time (COT), wherein the indication is for at least one of a set of Control Resource Sets (CORESETs), a set of Quasi co-location (QCL) assumptions, a set of uplink resources, or a set of spatial relations for determining a default beam;
   determining the default beam from the base station for use during the COT based on the indication; and
   transmitting or receiving a transmission using the default beam.

2. The method of claim 1, wherein the default beam comprises a default reception beam that is selected based on a lowest CORESET identifier (ID) from among the set of CORESETs or the set of QCL assumptions.

3. The method of claim 1, wherein for a CORESET that is not comprised in the set of CORESETs, the UE determines the default beam based on a lowest CORESET identifier (ID) from among the set of CORESETs or the set of QCL assumptions.

4. The method of claim 1, wherein the default beam comprises a default transmission beam that is selected based on the indication of the set of uplink resources or the set of spatial relations for determining the default beam.

5. The method of claim 4, wherein the set of uplink resources correspond to at least one of a Sounding Reference Signal (SRS), an uplink control channel, or an uplink data channel.

6. The method of claim 4, wherein the set of spatial relations for determining the default beam comprise spatial relations for selecting at least one of a Sounding Reference Signal (SRS), an uplink control channel, or an uplink data channel for an uplink transmission from the UE.

7. The method of claim 4, wherein the indication comprises uplink resources for a first uplink channel, and wherein the UE determines the default beam for a second uplink channel based on a beam used for the first uplink channel.

8. An apparatus for wireless communication at a User Equipment (UE), comprising:
   a memory; and
   at least one processor coupled to the memory and configured to:
   receive, from a base station, an indication corresponding to a Channel Occupancy Time (COT), wherein the indication is for at least one of a set of Control Resource Sets (CORESETs), a set of Quasi co-location (QCL) assumptions, a set of uplink resources, or a set of spatial relations for determining a default beam;
   determine the default beam from the base station for use during the COT based on the indication; and
   transmit or receive a transmission using the default beam.

9. The apparatus of claim 8, wherein the default beam comprises a default reception beam that is selected based on a lowest CORESET identifier (ID) from among the set of CORESETs or the set of QCL assumptions.

10. The apparatus of claim 8, wherein for a CORESET that is not comprised in the set of CORESETs, the UE determines the default beam based on a lowest CORESET identifier (ID) from among the set of CORESETs or the set of QCL assumptions.

11. The apparatus of claim 8, wherein the default beam comprises a default transmission beam that is selected based on the indication of the set of uplink resources or the set of spatial relations for determining the default beam.

12. The apparatus of claim 11, wherein the set of uplink resources correspond to at least one of a Sounding Reference Signal (SRS), an uplink control channel, or an uplink data channel.

13. The apparatus of claim 11, wherein the set of spatial relations for determining the default beam comprise spatial relations for selecting at least one of a Sounding Reference Signal (SRS), an uplink control channel, or an uplink data channel for an uplink transmission from the UE.

14. The apparatus of claim 11, wherein the indication comprises uplink resources for a first uplink channel, and wherein the UE determines the default beam for a second uplink channel based on a beam used for the first uplink channel.

15. A method of wireless communication at a base station, comprising:
   sending, to a UE, an indication of at least one of a set of Control Resource Sets (CORESETs), a set of Quasi co-location (QCL) assumptions, a set of uplink resources, or a set of spatial relations for determining a default beam, the indication being for use in determining the default beam for use in a Channel Occupancy Time (COT); and
   transmitting or receiving a transmission based on the default beam.

16. The method of claim 15, wherein the indication indicates the set of CORESETs, and wherein the default beam is a default reception beam.

17. The method of claim 15, wherein the indication indicates the set of QCL assumptions, and wherein the default beam is a default reception beam.

18. The method of claim 15, wherein the indication indicates the set of uplink resources, and wherein the default beam comprises a default transmission beam.

19. The method of claim 18, wherein the set of uplink resources comprise at least one of a Sounding Reference Signal (SRS), an uplink control channel, or an uplink data channel.

20. The method of claim 15, wherein the indication indicates the set of spatial relations for determining the default beam, and wherein the default beam comprises a default transmission beam.

21. The method of claim 20, wherein the set of spatial relations for determining the default beam comprise spatial relations for selecting at least one of a Sounding Reference Signal (SRS), an uplink control channel, or an uplink data channel.

22. The method of claim 15, wherein the indication comprises uplink resources for a first uplink channel, and wherein the default beam for a second uplink channel is indicated based on a beam used for the first uplink channel.

23. An apparatus for wireless communication at a base station, comprising:
 a memory; and
 at least one processor coupled to the memory and configured to:
  send, to a User Equipment (UE), an indication of at least one of a set of Control Resource Sets (CORESETs), a set of Quasi co-location (QCL) assumptions, a set of uplink resources, or a set of spatial relations for determining a default beam, the indication being for use in determining the default beam for use in a Channel Occupancy Time (COT); and
  transmit or receive a transmission based on the default beam.

24. The apparatus of claim 23, wherein the indication indicates the set of CORESETs, and wherein the default beam is a default reception beam.

25. The apparatus of claim 23, wherein the indication indicates the set of QCL assumptions, and wherein the default beam is a default reception beam.

26. The apparatus of claim 23, wherein the indication indicates the set of uplink resources, and wherein the default beam comprises a default transmission beam.

27. The apparatus of claim 26, wherein the set of uplink resources comprise at least one of a Sounding Reference Signal (SRS), an uplink control channel, or an uplink data channel.

28. The apparatus of claim 23, wherein the indication indicates the set of spatial relations for determining the default beam, and wherein the default beam comprises a default transmission beam.

29. The apparatus of claim 28, wherein the set of spatial relations for determining the default beam comprise spatial relations for selecting at least one of a Sounding Reference Signal (SRS), an uplink control channel, or an uplink data channel.

30. The apparatus of claim 23, wherein the indication comprises uplink resources for a first uplink channel, and wherein the default beam for a second uplink channel is indicated based on a beam used for the first uplink channel.

* * * * *